United States Patent
Wysong

(10) Patent No.: US 10,155,856 B2
(45) Date of Patent: *Dec. 18, 2018

(54) USE OF Z-HFO-1,1,1,4,4,4-HEXAFLUORO-2-BUTENE IN HIGH TEMPERATURE FOAMING APPLICATION

(71) Applicant: THE CHEMOURS COMPANY FC, LLC, Wilmington, DE (US)

(72) Inventor: Ernest Byron Wysong, Hockessin, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/408,838

(22) Filed: Jan. 18, 2017

(65) Prior Publication Data

US 2017/0210870 A1 Jul. 27, 2017

Related U.S. Application Data

(60) Provisional application No. 62/281,948, filed on Jan. 22, 2016.

(51) Int. Cl.

| | |
|---|---|
| *C08J 9/14* | (2006.01) |
| *C08G 18/08* | (2006.01) |
| *C08G 18/18* | (2006.01) |
| *C08G 18/40* | (2006.01) |
| *C08G 18/72* | (2006.01) |
| *C08G 101/00* | (2006.01) |

(52) U.S. Cl.
CPC .............. *C08J 9/146* (2013.01); *C08G 18/14* (2013.01); *C08G 18/18* (2013.01); *C08G 18/1825* (2013.01); *C08G 18/1833* (2013.01); *C08G 18/4018* (2013.01); *C08G 18/72* (2013.01); *C08G 2101/00* (2013.01); *C08G 2101/0025* (2013.01); *C08J 2201/022* (2013.01); *C08J 2203/162* (2013.01); *C08J 2205/052* (2013.01); *C08J 2205/10* (2013.01); *C08J 2207/04* (2013.01); *C08J 2375/04* (2013.01); *C08J 2375/08* (2013.01)

(58) Field of Classification Search
CPC .... C08G 18/14; C08G 18/18; C08G 18/1825; C08G 18/1833; C08G 18/4018; C08G 18/72; C08G 2101/0025; C08J 9/146; C08J 2203/162; C08J 2205/10; C08J 2375/08

See application file for complete search history.

(56) References Cited

U.S. PATENT DOCUMENTS

| | | | |
|---|---|---|---|
| 4,394,491 A | 7/1983 | Hoffman | |
| 5,164,419 A | 11/1992 | Bartlett et al. | |
| 2012/0104307 A1* | 5/2012 | Bogdan | C08J 9/149 252/62 |
| 2013/0059934 A1* | 3/2013 | Burgess | C08J 9/146 521/131 |
| 2013/0149452 A1* | 6/2013 | Bogdan | C08J 9/00 427/373 |

FOREIGN PATENT DOCUMENTS

| | | |
|---|---|---|
| EP | 2 447 310 A2 | 5/2012 |
| WO | 2014/113379 A1 | 7/2014 |

OTHER PUBLICATIONS

Boden H., et al., Polyurethane Processing, 1985, Chapter 4, Hanser Publishers, New York, NY.

Taverna M., et al., Soluble or Insoluble Alternative Blowing Agents? Processing Technologies for Both Alternatives, Presented by the Equipment Manager, 1991, published in Polyurethanes World Congress 1991 from the Proceedings of the SPI/ISOPA Sep. 24-26, 1991, Acropolis, Nice, France.

Grünbauer H. J. M., et al., Fine Celled CFC-Free Rigid Foam—New Machinery with Low Boiling Blowing Agents, 1992, published in Polurethanes 92 from the Proceedings of the SPI $34^{th}$ Annual Technical/Marketing Conference, Oct. 21-Oct. 24, New Orleans, Louisiana.

* cited by examiner

*Primary Examiner* — John M Cooney

(57) ABSTRACT

The present invention provides a process comprising reacting polyisocyanate with active hydrogen-containing compound in the presence of Z-1,1,1,4,4,4-hexafluoro-2-butene at a temperature of at least 135° F. (57.2° C.) or a temperature of 135° F. (57.2° C.) to 150° F. (65.6° C.) to obtain as a result thereof, foamed reaction product, wherein the thermal conductivity of the foamed reaction product exhibits no appreciable change at any of the foaming temperatures within this range.

8 Claims, No Drawings

USE OF Z-HFO-1,1,1,4,4,4-HEXAFLUORO-2-BUTENE IN HIGH TEMPERATURE FOAMING APPLICATION

BACKGROUND INFORMATION

Field of the Disclosure

This invention relates to the foaming of the reaction product of polyisocyanate and active hydrogen-containing compound such as polyol in the presence of Z—HFO-1,1,1,4,4,4-hexafluoro-2-butene blowing agent at high temperature.

Description of the Related Art

EP 2 447 310 discloses the use of 1336mzzm as being 1,1,1,3,3,3-hexafluorobutene and being applicable as a blowing agent to produce polyurethane and polyisocyanurate foams, but having the disadvantage of the foams having high thermal conductivity arising from the above atmospheric pressure boiling point of this compound [0007-0008]. The correct identity of 1336mzzm, which is the same as 1336mzz, is 1,1,1,4,4,4-hexafluoro-2-butene. The Z-isomer has a boiling point of 33° F. EP'310 overcomes this problem by combining the 1336mzz with 1-chloro-3,3,3-trifluoropropene (1233zd) as the blowing agent to produce the polyurethane and polyisocyanurate foams. The maximum temperature of the raw materials used in the foaming process, which is the foaming temperature is disclosed to be 70° F.) [0051]. The raw materials are the polyol masterbatch and the polyisocyanate, which are commonly referred to as the B-side and A-side compositions (reactants), respectively

SUMMARY

It has been discovered that carrying out the foaming at high temperature using Z—HFO-1,1,1,4,4,4-hexafluoro-2-butene as the blowing agent in the polyisocyanate/polyol reaction produces foam of excellent (low) thermal conductivity. This is in contrast to the performance of the most prominent blowing agent for these foams, i.e. 1,1,1,3,3-pentafluoropropane (HFC-245fa). As the foaming temperature using HFC-245fa as the blowing agent increases from 100° F. (37.7° C.), the result is poorer thermal performance for the foam, i.e. increasing thermal conductivity.

The present invention is the process comprising reacting polyisocyanate with active hydrogen-containing compound in the presence of Z-1,1,1,4,4,4-hexafluoro-2-butene (Z-1336mzz) at a temperature of at least 135° F. to obtain as a result thereof, foamed reaction product. The Z-1336mzz is the blowing agent causing the reaction product to foam. The reaction temperature is also the foaming temperature.

The foaming temperature is the temperature of the polyisocyanate and active hydrogen-containing reactants and the compositions containing these reactants i.e. the A-side composition containing the polyisocyanate and the B-side composition containing the active-hydrogen-containing compound. This is the temperature of the reactants and their respective compositions (A-side and B-side) at the time of feeding to the apparatus that mixes them together, resulting in production of the foamed reaction product.

The maximum foaming temperature is application dependent in the sense that increasing foaming temperature is accompanied by increasing reaction rate. The foaming temperature should not be so high that it is detrimental to the foamed reaction product. The most common detriment would be an increase in thermal conductivity. The preferred maximum foaming temperature is 150° F. (65.6° C.). The present invention contemplates foaming temperatures of 135° F. (57.2° C.) to 150° F. (65.6° C., 135° F. (57.2° C.) to 145° F. (62.8° C., and 140° F. (60.0° C.) to 145° F. (62.8° C.) and 140° F. (60.0° C.) to 150° F. (65.6° C.).

Surprisingly, in comparison with thermal conductivity increasing when HFC-245fa is used as the blowing agent at foaming temperatures increasing from 100° F. (37.7° C.) to 150° F. (65.6° C., use of Z-1336mzz as the blowing agent has the effect of decreasing thermal conductivity of the foamed reaction product at foaming temperatures increasing from 100° F. (37.7° C.). Foaming at high temperatures has the additional advantage of improved foaming especially on cold substrates.

The reaction product that is foamed is preferably polyurethane or polyisocyanurate or a mixture of these polymers.

DETAILED DESCRIPTION

The active hydrogen-containing compound reactant in the process of the present invention includes those described in U.S. Pat. No. 4,394,491 and in WO 2014/-113379 (isocyanate-reactive groups). "Active hydrogen" means that the hydrogen of the active-hydrogen-containing compound is reactive with the isocyanate of the polyisocyanate reactant. The active hydrogen-containing compound contains at least two groups that contain active hydrogen (atoms). Examples of such compounds have at least two hydroxyl groups per molecule, and more specifically comprise polyols, such as polyether or polyester polyols. Some of the hydroxyl groups can be replaced by amine groups, whereby the active hydrogen-containing compound contains both hydroxyl and amine groups. Preferably, the compound contains at least two hydroxyl groups, whereby the compound is a polyol. Examples of such polyols are those which have an equivalent weight of about 50 to about 700, normally of about 70 to about 300, more typically of about 90 to about 270, and carry at least 2 hydroxyl groups, usually 3 to 8 such groups.

Examples of suitable polyols comprise polyester polyols such as aromatic polyester polyols, e.g., those made by transesterifying polyethylene terephthalate (PET) scrap with a glycol such as diethylene glycol, or made by reacting phthalic anhydride with a glycol. The resulting polyester polyols may be reacted further with ethylene and/or propylene oxide to form an extended polyester polyol containing additional internal alkyleneoxy groups.

Examples of suitable polyols also comprise polyether polyols such as polyethylene oxides, polypropylene oxides, mixed polyethylene-propylene oxides with terminal hydroxyl groups, among others. Other suitable polyols can be prepared by reacting ethylene and/or propylene oxide with an initiator having 2 to 16, generally 3 to 8 hydroxyl groups as present, for example, in glycerol, pentaerythritol and carbohydrates such as sorbitol, glucose, sucrose and the like polyhydroxy compounds. Suitable polyether polyols can also include aliphatic or aromatic amine-based polyols.

An example of polyol also containing amine is the Mannich polyol.

With respect to the polyisocyanate component (reactant), it is normally selected in such proportion relative to that of the active hydrogen-containing compound that the ratio of the equivalents of isocyanate groups to the equivalents of active hydrogen groups, i.e., the foam index, is from about 0.9 to about 10 and in most cases from about 1 to about 4.

While any suitable polyisocyanate can be employed in the instant process, examples of polyisocyanates useful for making polyisocyanate-based foam comprise at least one of aromatic, aliphatic and cycloaliphatic polyisocyanates, among others. Representative members of these compounds comprise diisocyanates such as meta- or paraphenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate (and isomers), napthylene-1,5-diisocyanate, 1-methylphenyl-2,4-phenyldiisocyanate, diphenylmethane-4,4-diisocyanate, diphenylmethane-2,4-diissocyanate, 4,4-biphenylenediisocyanate and 3,3-dimethyoxy-4,4 biphenylenediisocyanate and 3,3-dimethyldiphenylpropane-4,4-diisocyanate; triisocyanates such as toluene-2,4,6-triisocyanate and polyisocyanates such as 4,4-dimethyldiphenylmethane-2,2,5,5-tetraisocyanate and the diverse polymethylenepoly-phenylopolyisocyanates, mixtures thereof, among others.

A crude polyisocyanate may also be used in the practice of this invention, such as the crude toluene diisocyanate obtained by the phosgenating a mixture comprising toluene diamines, or the crude diphenylmethane diisocyanate obtained by the phosgenating crude diphenylmethanediamine. Specific examples of such compounds comprise methylene-bridged polyphenylpolyisocyanates, due to their ability to crosslink the polyurethane.

The polyisocyanate reactant can be a mixture of different polyisocyanates, and the active hydrogen-containing compound can be a mixture of different active-hydrogen-containing compounds.

Typically, before reacting with a suitable polyisocyanate, the active hydrogen-containing compound and optionally other additives are mixed with the blowing agent to form a composition. Such composition is typically known in the art as an isocyanate-reactive preblend, or B-side composition. The B-side composition contains the active hydrogen-containing compound and preferably also contains the Z-1336mzz blowing agent. The A-side composition preferably comprises the polyisocyanate. The foam-forming composition comprising the A-side composition and the B-side composition can be prepared in any manner convenient to one skilled in this art, including simply weighing desired quantities of each component (ingredient) and, thereafter, combining them in an appropriate container at the temperatures and pressures desired.

It is often desirable to employ minor amounts of additives in the B-side composition. Among these additives comprise one or more members from the group consisting of catalysts, surfactants, flame retardants such as TCPP, preservatives, colorants, antioxidants, reinforcing agents, filler, and antistatic agents, among others well known in this art.

Depending upon the composition, a surfactant can be employed to stabilize the foaming reaction mixture while curing. Such surfactants normally comprise a liquid or solid organosilicone compound. The surfactants are employed in amounts sufficient to stabilize the foaming reaction mixture against collapse and to prevent the formation of large, uneven cells. In one embodiment of this invention, about 0.1% to about 5% by weight of surfactant based on the total weight of the foamable composition, i.e. total weight of all foaming ingredients (i.e. blowing agents+active hydrogen-containing compounds+polyisocyanates+additives,) are used. In another embodiment of this invention, about 1.5% to about 3% by weight of surfactant based on the total weight of all foaming ingredients are used.

One or more catalysts for the reaction of the active hydrogen-containing compounds, e.g. polyols, with the polyisocyanate may be also employed. The selection of catalyst together with the reactants can favor formation of foamed polyisocyanurate instead of or mixed with foamed polyisocyanate in the practice of the process of the present invention. While any suitable urethane catalyst may be employed, specific catalyst comprise tertiary amine compounds and organometallic compounds. Exemplary such catalysts are disclosed, for example, in U.S. Pat. No. 5,164,419, which disclosure is incorporated herein by reference. For example, a catalyst for the trimerization of polyisocyanates, such as an alkali metal alkoxide, alkali metal carboxylate, or quaternary amine compound, may also optionally be employed herein. Such catalysts are used in an amount which measurably increases the rate of reaction of the polyisocyanate. Typical amounts of catalysts are about 0.1% to about 5% by weight based on the total weight of all foaming ingredients.

In one embodiment of the present invention, the active hydrogen-containing compound and said Z-1,1,1,4,4,4-hexafluoro-2-butene are combined into a composition, which is the B-side composition, prior to reacting the active-hydrogen-containing compound with the polyisocyanate. In another embodiment, this composition also comprises at least one of catalyst, surfactant, flame retardant. In still another embodiment, this composition contains each of the catalyst, surfactant, and flame retardant.

The process of the present invention is not limited to the specifics disclosed above with respect to the polyisocyanate and active hydrogen-containing compound reactants and the additives present in the A-side or B-side compositions. The relative amounts of polyisocyanate and active-hydrogen-containing compound reactants can be varied to obtain the foam desired, preferably a rigid foam. Excess polyisocyanate reactant can provide a foamed reaction product of both polyurethane and polyisocyanurate. The product of this reaction is foamed polyurethane or foamed polyisocyanurate, also depending on the identity of the polyisocyanate and active hydrogen-containing compound reactants and their relative amounts. The polyurethane and polyisocyanurate reaction products (foamed) resulting from the process of the present invention are polymers. When these polymers are both produced by the reaction between polyol and polyisocyanate, they can be considered to be a mixture thereof.

These are conventional aspects of the present invention, wherein the invention resides in the use of Z-1336mzz as the blowing agent at high foaming temperatures as described above used to produce foaming of the reaction product. Thus, the present invention is applicable to any foamable composition arising from the reaction of polyisocyanate with active hydrogen-containing compound.

In the process of making a polyurethane-based or polyisocyanurate-based foam or polyurethane/polyisocyanurate-based foam, the active hydrogen-containing compound, polyisocyanate and other components are contacted, thoroughly mixed, and permitted to expand and cure into a cellular polymer. The mixing apparatus is not critical, and various conventional types of mixing head and spray apparatus are used. By conventional apparatus is meant apparatus, equipment, and procedures conventionally employed in the preparation of isocyanate-based foams in which conventional isocyanate-based foam blowing agents, such as fluorotrichloromethane ($CCl_3F$, CFC-11), are employed. Such conventional apparatus are discussed by: H. Boden et al. in chapter 4 of the Polyurethane Handbook, edited by G. Oertel, Hanser Publishers, New York, 1985; a paper by H. Grunbauer et al. titled "Fine Celled CFC-Free Rigid Foam—New Machinery with Low Boiling Blowing Agents" published in Polyurethanes 92 from the Proceedings of the SPI 34th Annual Technical/Marketing Conference, Oct. 21-Oct.

24, 1992, New Orleans, La.; and a paper by M. Taverna et al. titled "Soluble or Insoluble Alternative Blowing Agents? Processing Technologies for Both Alternatives, Presented by the Equipment Manufacturer", published in Polyurethanes World Congress 1991 from the Proceedings of the SPI/ISOPA Sep. 24-26, 1991, Acropolis, Nice, France.

The temperature of polyisocyanate and active hydrogen-containing compound reactants fed to the mixing apparatus is preferably the same, which aids in viscosity matching of the reactants as an aid to complete mixing together. This temperature is any of the foaming temperatures described above for practice of the present invention. At these high foaming temperatures, it is important that the mixing occurs quickly to accommodate the increased reaction rate accompanying these high temperatures. If the reactants are at a different temperature, it is preferred that the average of these different temperatures is at least one of the foaming temperatures described above for practice of the present invention. Viscosity matching can be accomplished by the reactants being at different temperatures.

The pressure of the apparatus to produce the spray of foaming reaction product can range from low pressure to high pressure. Low pressure is considered to be 100 psi (0.69 MPa) or less, generally at least 50 psi. High pressure is considered to be in the range of 1000 psi (6.9 MPa) to 2000 psi (13.8 MPa). These pressures are gauge pressure.

In one embodiment of this invention, a preblend of certain raw materials is prepared prior to reacting the polyisocyanate and active hydrogen-containing components. For example, it is often useful to blend the active hydrogen-containing compound, blowing agent, surfactant(s), catalysts(s) and other foaming ingredients, except for polyisocyanates, and then contact this blend (B-side composition) with the polyisocyanate. Alternatively, all the foaming ingredients may be introduced individually to the mixing zone where the polyisocyanate and active hydrogen-containing compound are contacted. It is also possible to pre-react all or a portion of the active hydrogen-containing compound with the polyisocyanate to form a prepolymer.

The invention composition and processes are applicable to the production of all kinds of polyurethane and/or polyisocyanurate foams, including, for example, integral skin, RIM and flexible foams, and in particular rigid closed-cell polymer foams useful in spray insulation, as pour-in-place appliance foams, or as rigid insulating board stock and laminates.

This process of the present invention also includes the making of foamed reaction products comprising closed-cell polyurethane or polyisocyanurate polymer. For good thermal performance, preferably, the foam cells within the foamed reaction product are an average of at least 90% closed cells as determined in accordance with ASTM D 6226.

The process of the present invention produces high quality foamed structure, not only characterized by low density and high % closed cells as mentioned above, but also by density uniformity across the thickness of the foamed structure.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified. If in the claim, such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole. The transitional phrase "consisting essentially of" is used to define a composition, method that includes materials, steps, features, components, or elements, in addition to those literally disclosed provided that these additional included materials, steps, features, components, or elements do not materially affect the basic and novel characteristic(s) of the claimed invention, especially the mode of action to achieve the desired result of any of the processes of the present invention. The term 'consisting essentially of' occupies a middle ground between "comprising" and 'consisting of'.

Where applicants have defined an invention or a portion thereof with an open-ended term such as "comprising," it should be readily understood that (unless otherwise stated) the description should be interpreted to also include such an invention using the terms "consisting essentially of" or "consisting of."

EXAMPLES

Comparison Example—Spray Foaming of Polyisocyanate/Polyol Reaction Product Containing HFC-245Fa Blowing Agent The blowing agent is in the B-side (polyol) composition. The foaming is carried out at temperatures of 110° F. (43.3° C.), 130° F. (54.4° C.) and 150° F. (65.6° C.). The foaming results at these temperatures are reported in Table 1.

TABLE 1

Use of HFC-245fa as blowing agent at increasing temperatures

| Foaming temp. (° F.(° C.)) | Foam Density (kg/m$^3$) | Thermal Conductivity (k-factor) |
|---|---|---|
| 110(43.3° C.) | 35.6 | 0.1593 (5.57 × 10$^{-5}$) |
| 130(54.4° C.) | 37.0 | 0.1651 (5.77 × 10$^{-5}$) |
| 150(65.6° C.) | 39.2 | 0.1741 (6.09 × 10$^{-5}$) |

Thermal conductivity is the following units: Btu in/hr·ft$^{2\circ}$ F. (cal/cm·s·° C.).
Thermal conductivity is determined at 75° F. (23.9° C.).

As shown in Table 1, as the foaming temperature increases, so does the foam density, and as expected, the thermal conductivity also increases by more than 9%, indicating a deterioration of the effectiveness of the foam as a thermal insulator.

Example 1 of the Invention—Foaming Using Z-1,1,1,4,4,4-hexafluoro-2-butene and as the Blowing Agent As in the case of the Comparison Example, the blowing agent is in the B-side (polyol) composition and the foaming is carried out at temperatures of 110° F. (43.3° C.), 130° F.

(54.4° C.), and 150° F. (65.6° C.). The foaming results at these temperatures are reported in Table 2.

TABLE 2

Use of Z-1336mzz as the blowing agent at increasing temperature

| Foaming temp. (° F.(° C.)) | Foam Density (kg/m³) | Thermal Conductivity (k-factor) |
|---|---|---|
| 110(43.3) | 35.4 | 0.1667 (5.82 × $10^{-5}$) |
| 130(54.4) | 36.7 | 0.1597 (5.58 × $10^{-5}$) |
| 150(65.6) | 38.3 | 0.1551 (5.45 × $10^{-5}$) |

Thermal conductivity is determined at 75° F. (23.9° C.). The units of thermal conductivity are the same as in Table 1.

In contrast to when HFC-245fa is used as the blowing agent, substitution of the same amount of Z—HFO-1336mzz in the B-side composition results in the foam exhibiting lower thermal conductivity as the foaming temperature is increased. It is also surprising that this decrease in thermal conductivity is accompanied by an increase in density of the foamed reaction product.

The B-side composition used in both the Comparison Example and Example 1 is given in the following Table 3.

TABLE 3

| B-Side composition | |
|---|---|
| Ingredient | Wt % |
| Polyester polyol | 31.25 |
| Mannich polyol | 32.10 |
| Tris(chloropropyl)phosphate (TCPP) | 14.00 |
| Silicone surfactant | 1.00 |
| 2-butoxy ethanol co-solvent | 3.00 |
| Glycerin | 1.00 |
| 1,5-bis(dimethylamino)-3-oxapentane catalyst | 0.70 |
| 2(-N,N,-dimethylaminoethyl-N-methylamino)ethanol catalyst | 0.30 |

TABLE 3-continued

| B-Side composition | |
|---|---|
| Ingredient | Wt % |
| 1,3-propanediamine,N-[3-(dimethylamino)propyl]-N,N',N'-trimethyl catalyst | 2.60 |
| Water | 1.80 |
| Z-1336mzz or HFC-245fa | 12.25/10 |
| Total | 100.00 |

The polyester polyol has a hydroxyl number of 307 mg KOH/g, nominal functionality of 2.2, and dynamic viscosity of 5,500 cps at 25° C.

The Mannich polyol has a hydroxyl number of 470 mg KOH/g, a nominal functionality of 4, and a dynamic viscosity of 10,000 cps at 25° C.

The 12.25 wt % applies to the Z-1336mzz blowing agent and the 10 wt % applies to the HFC-245fa blowing agent. These different wt % s correspond to equal-molar concentrations of these blowing agents. For the HFC-245fa B-side composition, the amounts of the other ingredients in the composition can be adjusted to arrive at 100 wt % for the sum of all 10 wt % s.

What is claimed is:

1. Process comprising reacting polyisocyanate with active hydrogen-containing compound in the presence of Z-1,1,1,4,4,4-hexafluoro-2-butene at a temperature of at least 135° F.(57.2° C.) to obtain as a result thereof, foamed reaction product.

2. The process of claim 1 wherein said temperature is 135° F.(57.2° C.) to 150° F.(65.6° C.).

3. The process of claim 1 wherein said temperature is 140° F.(60.0° C.) to 150° F.(65.6° C.).

4. The process of claim 1 wherein said active hydrogen-containing compound is polyol.

5. The process of claim 1 wherein said reaction product is polyurethane polyisocyanurate, or a mixture of these polymers.

6. The process of claim 1 wherein said active hydrogen-containing compound and said Z-1,1,1,4,4,4-hexafluoro-2-butene are combined into a composition prior to said reacting with said polyisocyanate.

7. The process of claim 6 wherein said composition also comprises at least one of catalyst, surfactant, flame retardant.

8. The process of claim 7 wherein said composition contains each of said catalyst, surfactant, and flame retardant.

* * * * *